Jan. 31, 1939.    J. W. TAYLOR    2,145,668
VENTILATING WINDOW
Filed Oct. 16, 1936    2 Sheets-Sheet 1
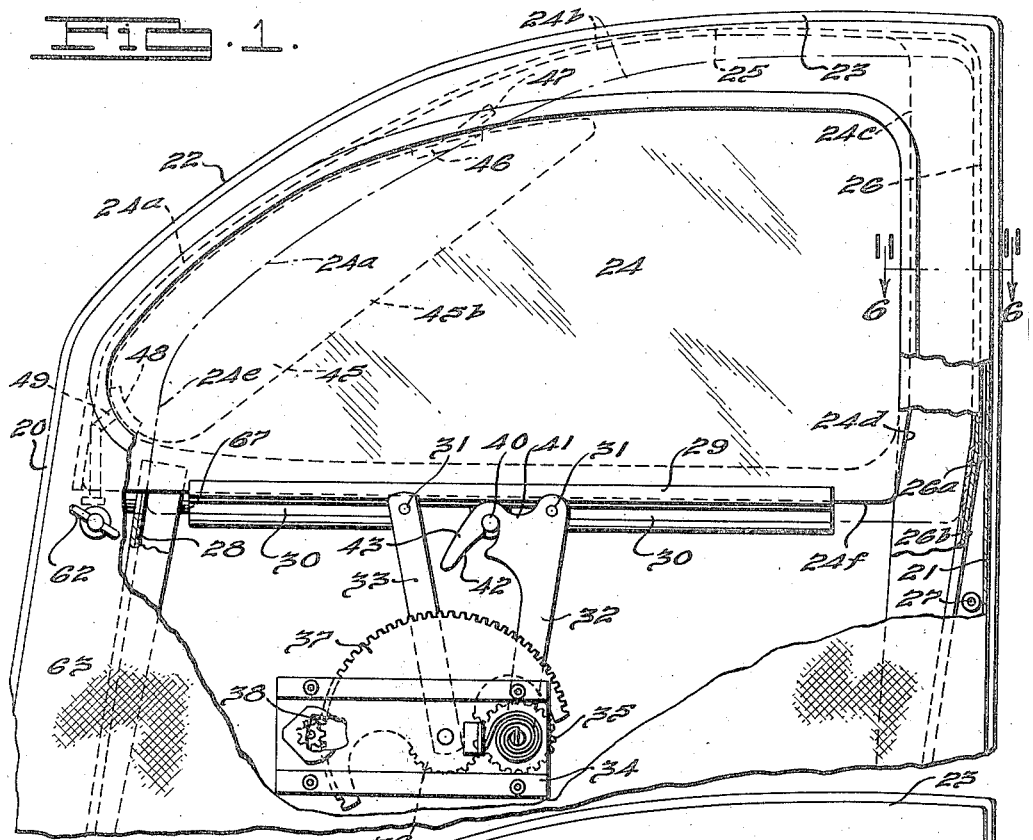
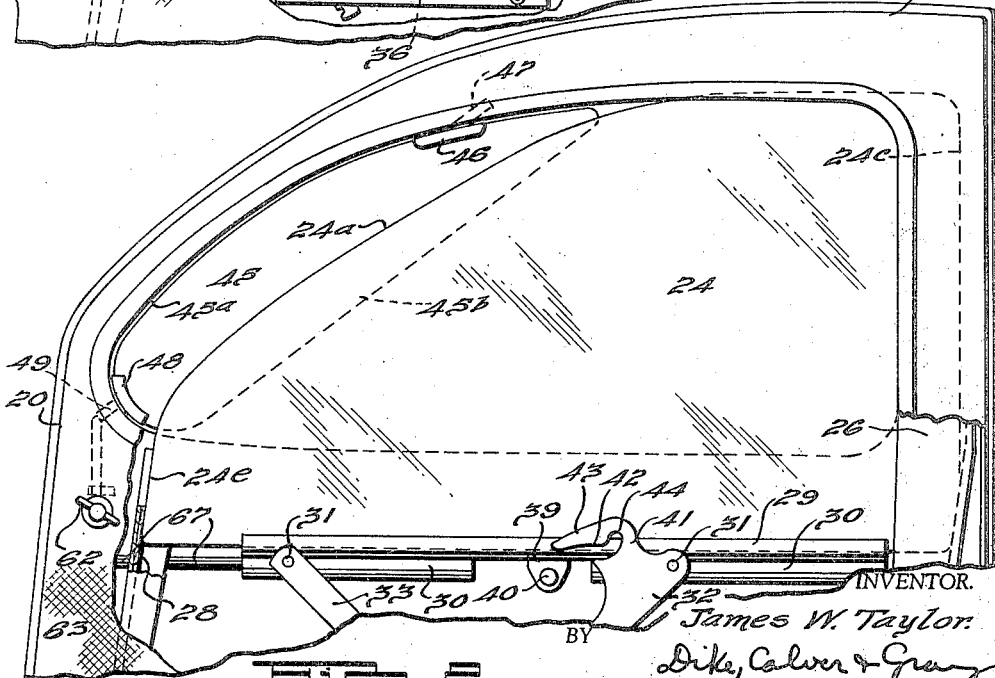
INVENTOR.
James W. Taylor.
BY Dike, Calvert & Gray
ATTORNEYS.

Jan. 31, 1939.  J. W. TAYLOR  2,145,668
VENTILATING WINDOW
Filed Oct. 16, 1936  2 Sheets-Sheet 2
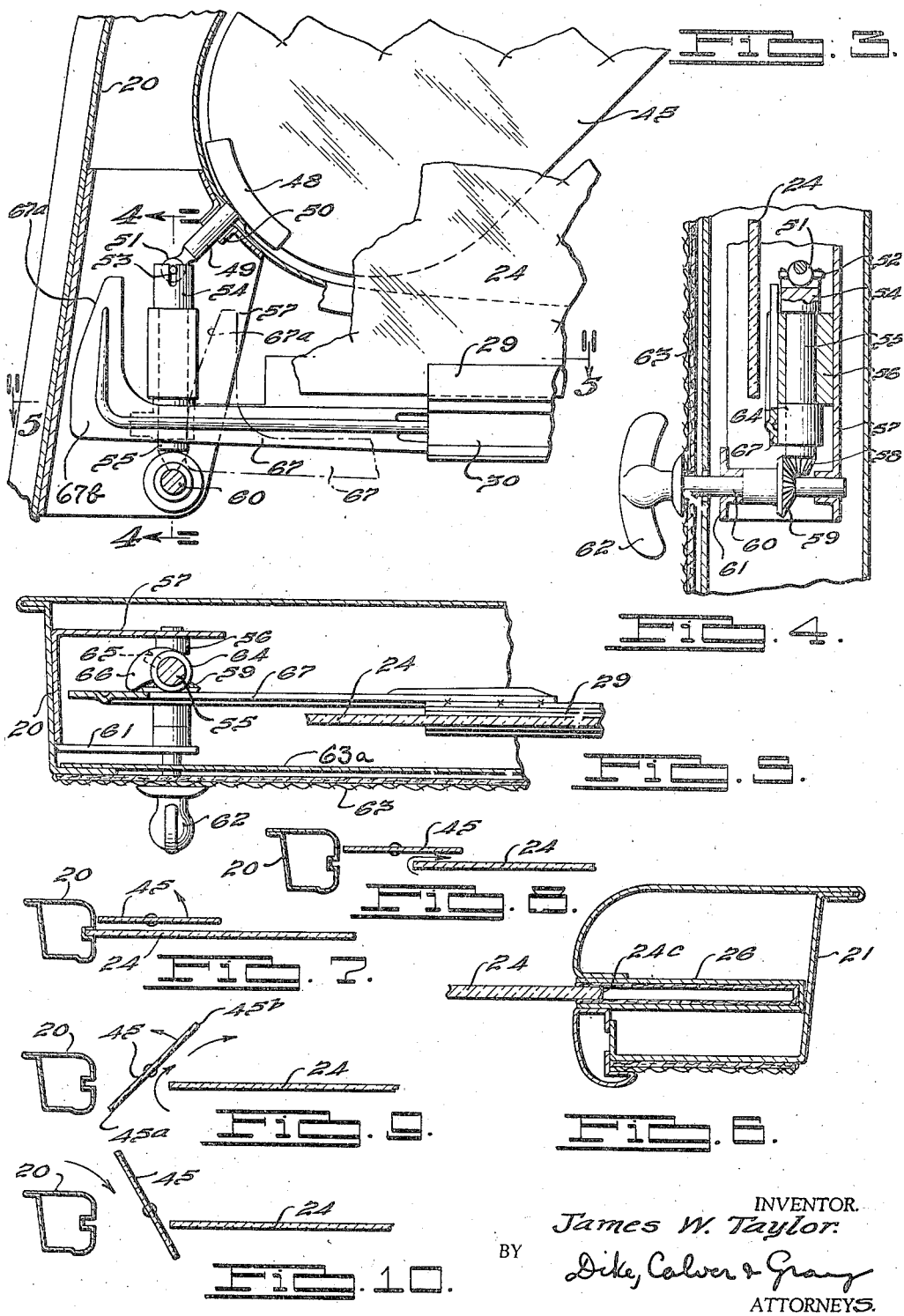
INVENTOR.
James W. Taylor.
BY
Dike, Calver & Gray
ATTORNEYS.

Patented Jan. 31, 1939

2,145,668

UNITED STATES PATENT OFFICE 2,145,668

VENTILATING WINDOW

James W. Taylor, Detroit, Mich., assignor to Marvel Equipment Corporation, Detroit, Mich., a corporation of Michigan Application October 16, 1936, Serial No. 105,970

10 Claims. (Cl. 296—44)

This invention relates to ventilating window structures for vehicle bodies, particularly automobile bodies, one of the objects of the invention being to improve and amplify the ventilating action and effects of ventilating window structures of that type wherein the window glass is shiftable in the plane of the glass, or longitudinally of the vehicle, to produce a ventilating slot or opening between one upright edge of the glass, usually the forward edge thereof, and the adjacent pillar or other portion of the exterior wall of the body.

A further object of the invention is to provide a ventilating window structure of the foregoing type having a transparent pivoted panel or wing arranged out of the plane of the main shiftable panel and adapted to be swung into various positions with relation to the main ventilating slot so as to augment the flow of air by suction through said slot from the interior of the body or to direct air through said slot into the body during the forward travel of the vehicle.

A further object is to provide a ventilating window structure including a transparent panel of an area to substantially close the vehicle door or side window opening and wherein means is provided for augmenting the size of the ventilating slot which may be produced upon shifting the transparent panel longitudinally of the vehicle or in the plane of the glass, whereby improved ventilating action may be produced during the travel of the vehicle.

Another object of the invention is to provide a window structure having a main transparent panel effective to substantially close the main window opening and movable into and out of a well therebelow and also having a horizontally swinging transparent panel of the wing type, the main panel being movable longitudinally to provide a ventilating slot or gap into which an edge of the swinging panel is movable when adjusted in a predetermined manner.

Still another object is to provide a ventilating window of the foregoing construction in which the wing is pivoted on an inclined axis intermediate its front and rear edges and is arranged and operated so as not to interfere with the independent opening and closing of the main panel.

Other objects of this invention will appear in the following description and appended claims, reference being had to the accompanying drawings forming a part of this specification wherein like reference characters designate corresponding parts in the several views.

Fig. 1 is a fragmentary side elevation of an automobile door embodying the present invention, the view being taken from the inside of the door and parts being broken away.

Fig. 2 is a somewhat similar view illustrating the main window glass in full ventilating position.

Fig. 3 is an enlarged fragmentary view illustrating the adjusting and control mechanism for the pivoted wing.

Fig. 4 is a section taken through lines 4—4 of Fig. 3 in the direction of the arrows.

Fig. 5 is a section taken substantially through lines 5—5 of Fig. 3 in the direction of the arrows.

Fig. 6 is an enlarged section taken substantially through lines 6—6 of Fig. 1 in the direction of the arrows.

Figs. 7, 8, 9 and 10 are fragmentary horizontal sectional views, largely diagrammatic, illustrating various positions of adjustment of the main window glass and pivoted wing.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is illustrated, by way of example, one embodiment of the present invention as applied to a front door of an automobile body. It will be understood, however, that the invention in certain of its broader aspects is also applicable to other portions of a vehicle body such as the rear quarter window of an automobile. In the illustrated embodiment the door is provided with a front pillar 20 and a rear pillar 21 which are preferably formed of pressed steel and constructed in conventional manner. The upper part of the front pillar 20 above the window sill has a rearwardly sloping portion 22 conforming generally to the stream-lined configuration of the front end of the body, this frame portion 22 merging into a substantially horizontal header portion 23, thereby uniting the front and rear pillars. The framing 20—23 defines a main window opening, as illustrated, which is adapted to be closed by means of a single transparent panel or window glass 24. The forward upright edge 24a of the window 24 is rearwardly sloped substantially in accordance with the sloping configuration of the pillar section 22. The edge 24a of the window merges into a substantially horizontal upper edge 24b. The rear vertical edge of the glass is indicated at 24c, the lower portion of this rear edge being cut on a taper 24d. The forward sloping edge 24a of the glass terminates in an inclined straight edge portion 24e parallel to the tapered portion 24d. The lower edge of the glass is indicated at 24f.

The header 23 of the window framing is provided with a relatively deep channel 25 to receive the upper edge 24b of the window glass when fully closed, as clearly shown in Fig. 1. The rear pillar 21 of the window frame also has a relatively deep channel 26 to receive the rear edge 24c of the window glass when the glass is shifted rearwardly into ventilating position. The deep glass runway 26 in the rear pillar is illustrated in section in Fig. 6 and it will be understood that the deep glass receiving channel 25 in the header is substantially similar in construction.

The glass 24 is adapted to be moved substantially vertically, i. e. in an up and down direction into and out of a window well located below the main window opening, and the glass is adapted to be guided into and out of the well through the medium of front and rear guides. It will be seen from Figs. 1 and 2 that the rear guide channel 26 extends substantially in a straight vertical section to a point 26a. From this point the guide for the rear edge of the window slopes downwardly and forwardly into the well as shown at 26b, the taper being such as to cause the guide to clear the door handle shaft 27. Extending into the window well in the door is a front guide 28 which is parallel to the guide 26b, these guides being arranged to receive the front and rear tapered edges 24d and 24e and cooperate with the same to guide the glass into and out of the well.

Secured to the lower edge 24f of the glass panel 24 is a rolled metal channel section 29 formed with guideways 30 to receive studs 31 secured to the outer ends of window regulator arms 32 and 33. These arms are pivotally mounted at their lower ends on a mounting plate 34 secured to the inner door panel, and the arms are operated through suitable gearing 35, 36, 37 and 38 so as to swing in opposite directions for the purpose of raising and lowering the window 24 in conventional manner. In the present embodiment the arm 32 of the window regulator is constructed so as to shift the window glass 24 rearwardly in its plane into position to provide a ventilating slot or opening between the forward edge 24a of the glass and the inner edge of the framing 22, as illustrated by the dotted line position of the window glass 24 in Fig. 1. For this purpose a bracket 39 is attached to the channel or glass retainer member 29, this bracket carrying a projecting stud 40. The arm 32 has a cam extension 41 terminating in a goose-neck or hook-like portion 43 formed with a cam slot 42 terminating in an offset notched portion 44. In the full line position of the arm 32 in Fig. 1 the window glass 24 is in fully closed position, the forward edge 24a being confined within the glass receiving channel along the forward upright edge of the window opening and the upper edge 24b of the window glass being extended to the top of the deep channel 25 in the header 23. As the regulator arm 32 is swung in a clockwise direction the cooperation of the notch 44 with the stud 40 results in sliding the glass rearwardly in substantially a horizontal direction, and during this operation the upper edge 24b of the window glass slides rearwardly within the deep header channel 25 into the deep vertical channel 26 in the rear pillar. When the window glass 24 reaches the dotted line position of Fig. 1 it will be seen that the window glass 24 has been thus fully adjusted into its initial ventilating position. Thereafter, upon continued operation of the regulator arms 32 and 33 the glass 24 will be lowered to the bottom of the deep header channel 25, this second ventilating position of the glass being illustrated in full lines in Fig. 2. In this operation the upper substantially horizontal edge 24b of the glass will remain substantially within the deep header channel 25, and in advance thereof a ventilating slot of greater magnitude will have been produced. At the same time the tapered edges 24d and 24e of the glass will have been positioned in proper relation within the guides 26b and 28.

From the foregoing it will be seen, therefore, that substantially two distinct ventilating positions of the glass 24 may be produced, i. e. by first moving the window glass rearwardly so that the forward edge 24a thereof will assume the dotted line position of Fig. 1, thereby producing a ventilating slot of predetermined magnitude. Further movement of the window glass in a vertical direction so as to drop the upper edge 24b of the glass to the bottom of the deep header channel 25 will result, as shown in Fig. 2, in the production of a ventilating slot of twice, or nearly twice, the magnitude of the ventilating slot of Fig. 1. During this latter movement of the glass the cam edge 42 of the window regulator arm 32 cooperates with the stud 40 so as to hold the glass in proper position until it moves into the guides 26b and 28.

The present invention also contemplates the provision of means for improving and amplifying the ventilating action and effects of the above described ventilating window structure when the window glass 24 is shifted into a predetermined ventilating position. Accordingly, in the present embodiment of the invention there is provided a transparent panel 45 in the form preferably of a swinging glass wing which is mounted within the main window opening so as to extend along the forward upright edge thereof in a plane substantially parallel to the plane of the main window glass 24 and exteriorly thereof. The forward edge 45a of the glass wing 45 is shaped to correspond to the shape of the forward portion of the main window opening so as to form substantially a snug fit therein when the wing 45 is in its normal position parallel to the glass 24 as illustrated in Fig. 7. The wing is preferably constructed so that the rear edge 45b extends rearwardly of and overlaps the edge 24a of the window 24 in both of its ventilating positions shown in Figs. 1 and 2. The edge 45b of the wing is preferably inclined in a rearward direction generally in accordance with the slope of the edge 24a, and the area of the wing is such as to cause it to substantially cover the ventilating slot when the glass 24 is in the adjusted position of Fig. 2.

Attached to the upper edge of the wing 45 is a metal channel shaped clip 46 carrying an inclined pivot 47 journalled in a suitable socket in the header 23 of the door frame. Attached to the lower forward corner of the wing 45 is a similar channel shaped retainer clip 48 carrying a correspondingly inclined pivot stem 49. The pivot stems or pins 47 and 49 extend in alinement forming an axis about which the wing 45 is adapted to be swung, which axis is inclined in an upward and rearward direction substantially in accordance with the inclination of the pillar extension 22 and the forward edge 24a of the main window glass 24. Thus, the upper pivot 47 of the wing is located substantially to the rear of the lower forward pivot 48 and near the upper rear corner of the wing. Hence, the wing is pivoted intermediate its front and rear edges, the front edge 45a curving forwardly and thence downwardly from the pivot 47 to the pivot 48. The major area of the wing preferably lies to the rear of the axis of turning of the wing and, as shown in Figs. 2 and 8, overlaps the edge 24a of the window 24 in its full ventilating position.

The pivot pin 49 at the lower end of the wing 45 terminates in a ball 51 having a transverse coupling pin 52 slidably fitting into a vertical slot 53 in the upper enlarged end 54 of a vertical shaft 55, said end having a recess or socket to receive the ball 51, thereby providing a limited universal connection. The shaft 55 is journalled in a bearing member 56 fixed to a bracket plate 57, the latter being in the form of an angle plate secured to the pillar 20, as shown in Fig. 5. The upper end of this plate is formed to provide a bearing 50 for the pivot pin or stem 49 of the wing. The lower end of the shaft 55 has a bevel gear 58 meshing with a bevel gear 59 fastened to a short shaft 60. The outer end of the shaft 60 has a bearing in the plate 57, see Fig. 4, and the inner end has a bearing in an extension 61 of the central web of the angle bracket 57. The shaft 60 extends through apertures in the lock board panel 63a and the trim panel 63 of the door and carries a wing-type operating handle 62 by means of which it may be turned or rotated for the purpose of swinging the wing 45. It will be seen that the operating mechanism for the wing, connected to the lower pivot 49 and including the wing-type operating handle 62, is located in advance of the front guide 28 for the sliding window 24. Hence, the sliding window may be operated between open and closed positions without interference from the operating means for the swinging wing.

In accordance with the present invention there is also provided means controlled by the sliding window 24 or by predetermined movement thereof whereby the wing 45 may be positively moved out of the path of the window 24 when the latter is shifted into closed position. Moreover, this means also functions to block or prevent swinging of the wing into any position which would cause it to strike the glass 24 when the latter is at or near its closed position. Pinned at 65 to the lower end of the shaft 55 below the bearing 56 is a sleeve 64, and carried by this sleeve is a laterally projecting crank arm 66 forming a cam-like projection. Secured as by spot welding to the glass retainer channel 29 is a forwardly projecting cam bar 67 terminating at its forward end in an upstanding extension 67b formed with a cam edge 67a. The bar 67 and its extension 67b are longitudinally ribbed for the purpose of reinforcement. It will be seen from Figs. 3, 4 and 5 that the cam bar 67 is shiftable along the inner side of the sleeve 64 for engagement with the crank arm 66, and it will be seen that with the parts in the positions shown in Figs. 3 and 5 the face of the extension 67b lies opposite and in the path of the arm 66, thereby preventing rotative movement of the shaft 55 and blocking swinging movement of the wing.

In the present embodiment the construction of the cam extension 67b is such that it remains in the path of the crank arm 66, thereby blocking swinging movement thereof, until the window 24 reaches a predetermined ventilating position, such as the position shown in Fig. 2. Therefore, when the window 24 has been shifted horizontally and vertically into the ventilating position of Fig. 2 the crank arm 66 and hence the operating shaft 55 will be free to be rotated and at this time the handle 66 may be turned for the purpose of swinging the wing 45 through the ventilating slot between the forward edge 24a of the main window glass and the inner upright edge of the window framing 20, 22. The construction of the control mechanism for the pivoted wing is also such that in the event the wing 45 is in any position by which a portion thereof lies in the path of the window 24 the wing will be moved out of the path of the window 24 as the latter is shifted from the ventilating position of Fig. 2 toward closed position. The construction of the cam extension 67b and the cam edge 67a is such that the crank 66 will be engaged by a portion thereof in any ventilating position of the wing 45, such as shown in Figs. 9 and 10, when the main glass 24 is shifted past the position of Fig. 2 toward closed position. Thus, by virtue of this construction it is impossible for the operator inadvertently to close the window 24 while the wing 45 is in the path of this window and cause breakage of the glass. By reason of the improved construction it is also impossible for the operator to swing the wing inwardly so as to intersect the plane of the main glass 24 when the latter is closed or in any position which would permit the wing to strike the main glass. Thus, no operation of the wing and no operation of the sliding glass 24 at any time can be accomplished which would cause one glass to contact with the other glass and cause breakage.

In the diagrammatic views illustrated in Figs. 7 to 10 inclusive various relative positions of the main glass 24 and wing 45 are illustrated. The normal positions of the glass panels are illustrated in Fig. 7 at which time the window opening is fully closed by means of the panel 24 and the wing 45 is positioned exteriorly thereof substantially parallel to the plane of the panel 24. It will be seen from Fig. 8 that the main panel 24 may be slid rearwardly and also vertically into a ventilating position such as shown in Fig. 2. With the parts adjusted in this manner some air will be withdrawn by suction from the vehicle, as shown by the arrow, through the space between the overlapping portions of the wing 45 and panel 24 during the forward travel of the vehicle. After the main panel 24 has been moved into the required ventilating position, thereby unlocking or unblocking the operating mechanism for the wing 45, the latter may be swung into various positions, such as shown in Fig. 9, permitting a greater volume of air to be exhausted by suction from the interior of the vehicle. In the adjustment of the wing from the normal position of Fig. 7 the forward sloping edge 45a in advance of the pivotal axis is moved across the plane of the main panel 24 into the ventilating slot along the forward edge of this panel, as seen in Fig. 9, and the rear edge 45b of the wing moves out into the air stream. The wing 45 is preferably adjustable so that it may be moved through an angular path of at least 90° and preferably to a greater degree, as shown in Fig. 10, so as to act as a scoop in the path of the air stream to direct air through the ventilating slot into the interior of the vehicle. As indicated in Fig. 10 the arrangement is such that the wing 45 when adjusted to its fullest extent so as to move the rear edge 45b thereof to a position in advance of the axis and directly into the air stream, the portion of the wing at the opposite side of the pivotal axis will not engage or strike the forward edge 24a of the window and cause damage. Thus, it is possible by adjusting the wing 45 to an exhaust position, such as shown in Fig. 9, to amplify and augment the ventilating effects of the main ventilating slot, not only causing an increased volume of air to be sucked through the slot from the interior of the vehicle but also permitting some air to be directed into the vehicle between the front edge 45a of the wing and the front pillar 20, 22. It is also possible to move the wing into a scoop position, as shown in Fig. 10, to direct a stream of air at high velocity through the ventilating slot during the forward travel of the vehicle, thus producing a ventilating effect not heretofore possible in connection with a sliding ventilating window.

I claim:

1. A ventilating structure for a vehicle body having a window opening, comprising a main transparent panel effective to substantially close said opening, means for raising and lowering said panel, an auxiliary wing-type transparent panel pivotally mounted in said window opening to swing into and out of the plane of said main panel, and means under the control of the main panel for shifting said auxiliary panel out of the plane of the main panel.

2. A ventilating structure for a vehicle body having a window opening, comprising a main transparent panel effective to substantially close said opening and shiftable in its plane to produce a ventilating slot adjacent one upright edge thereof, an auxiliary wing-type transparent panel pivotally mounted in said window opening to swing into position with respect to said ventilating slot so as to cause an edge of the swinging panel to intersect the plane of the main panel, and means controlled by the closing movement of the main panel for shifting the auxiliary panel out of the plane of the main panel.

3. A ventilating structure for a vehicle body having a window opening, comprising a main transparent panel effective to substantially close said opening and shiftable in its plane to produce a ventilating slot adjacent one upright edge thereof, an auxiliary wing-type transparent panel pivotally mounted in said window opening to swing into and out of said slot, and a device carried by the main panel and cooperable with a part on the pivot of the auxiliary panel for shifting the same out of said ventilating slot.

4. A ventilating structure for a vehicle body having a window opening, comprising a main transparent panel effective to substantially close said opening and shiftable in its plane to produce a ventilating slot adjacent one upright edge thereof, an auxiliary wing-type transparent panel pivotally mounted in said window opening to swing into position with respect to said ventilating slot so as to cause an edge of the swinging panel to intersect the plane of the main panel, and a device carried by the main panel and cooperable with a part on the pivot of the auxiliary panel for shifting the latter out of the plane of the main panel during the closing movement of said main panel.

5. In a vehicle body, a door comprising framing constructed to provide a main window opening and a well therebelow, a main window panel adapted to substantially close said opening and movable substantially vertically into and out of said well, front and rear guides within the well for guiding the front and rear edges of the window panel, means for moving said panel in its plane to provide a ventilating slot along the forward upright edge of the panel, a transparent wing pivoted to said framing exteriorly of said window panel and angularly adjustable to cause the forward edge of the wing to move inwardly toward said ventilating slot and the rear edge to shift outwardly with respect to said window panel, said wing having upper and lower pivots, the lower pivot being positioned in advance of the forward edge of the main window panel when in ventilating position, and means connected to said lower pivot in advance of said front window guide for swinging said wing.

6. A ventilating structure for a vehicle body having a window opening, comprising a main transparent panel effective to substantially close said opening, means for raising and lowering said panel, an auxiliary wing-type transparent panel pivotally mounted in said window opening to swing into and out of the plane of said main panel and adapted to overlap said panel, and means under the control of the main panel for blocking swinging movement of said auxiliary panel into a position to engage the main panel.

7. A ventilating structure for a vehicle body having a window opening, comprising a main transparent panel effective to substantially close said opening, means for raising and lowering said panel, an auxiliary wing-type transparent panel pivotally mounted adjacent said window opening to swing into and out of the plane of said main panel, and means under the control of the main panel for blocking swinging movement of said auxiliary panel into a position to engage the main panel and also for moving said auxiliary panel out of the path of the main panel when the latter is moved toward closed position.

8. A ventilating structure for a vehicle body having a window opening, comprising a main transparent panel effective to substantially close said opening, means for raising and lowering said panel, an auxiliary wing-type transparent panel pivotally mounted adjacent said window opening to swing into and out of the plane of said main panel, and means under the control of the main panel for preventing engagement of one panel with the other panel when either panel is moved relatively to the other.

9. A ventilating structure for a vehicle body having a window opening, comprising a main transparent panel effective to substantially close said opening, means for raising and lowering said panel, an auxiliary wing-type transparent panel pivotally mounted against said window opening to swing into and out of the plane of said main panel, and means automatically operable upon movement of the main panel for moving said auxiliary panel out of the path of the main panel when the latter is moved toward closed position.

10. A ventilating structure for a vehicle body having a window opening, comprising a main transparent panel, means for shifting said panel toward and from its closed position, a pivotally mounted auxiliary wing-type panel adjacent said window opening and adapted to overlap the main panel in its closed position, and means automatically operable by the movement of the main panel into closed position for swinging said wing toward its closed position.

JAMES W. TAYLOR.

CERTIFICATE OF CORRECTION.

Patent No. 2,145,668. January 31, 1939.

JAMES W. TAYLOR.

It is hereby certified that error appears in the printed specification of the above numbered patent requiring correction as follows: Page 4, second column, line 59, claim 9, for the word "against" read adjacent; and that the said Letters Patent should be read with this correction therein that the same may conform to the record of the case in the Patent Office.

Signed and sealed this 4th day of April, A. D. 1939.

Henry Van Arsdale (Seal) Acting Commissioner of Patents.